Figure 1:
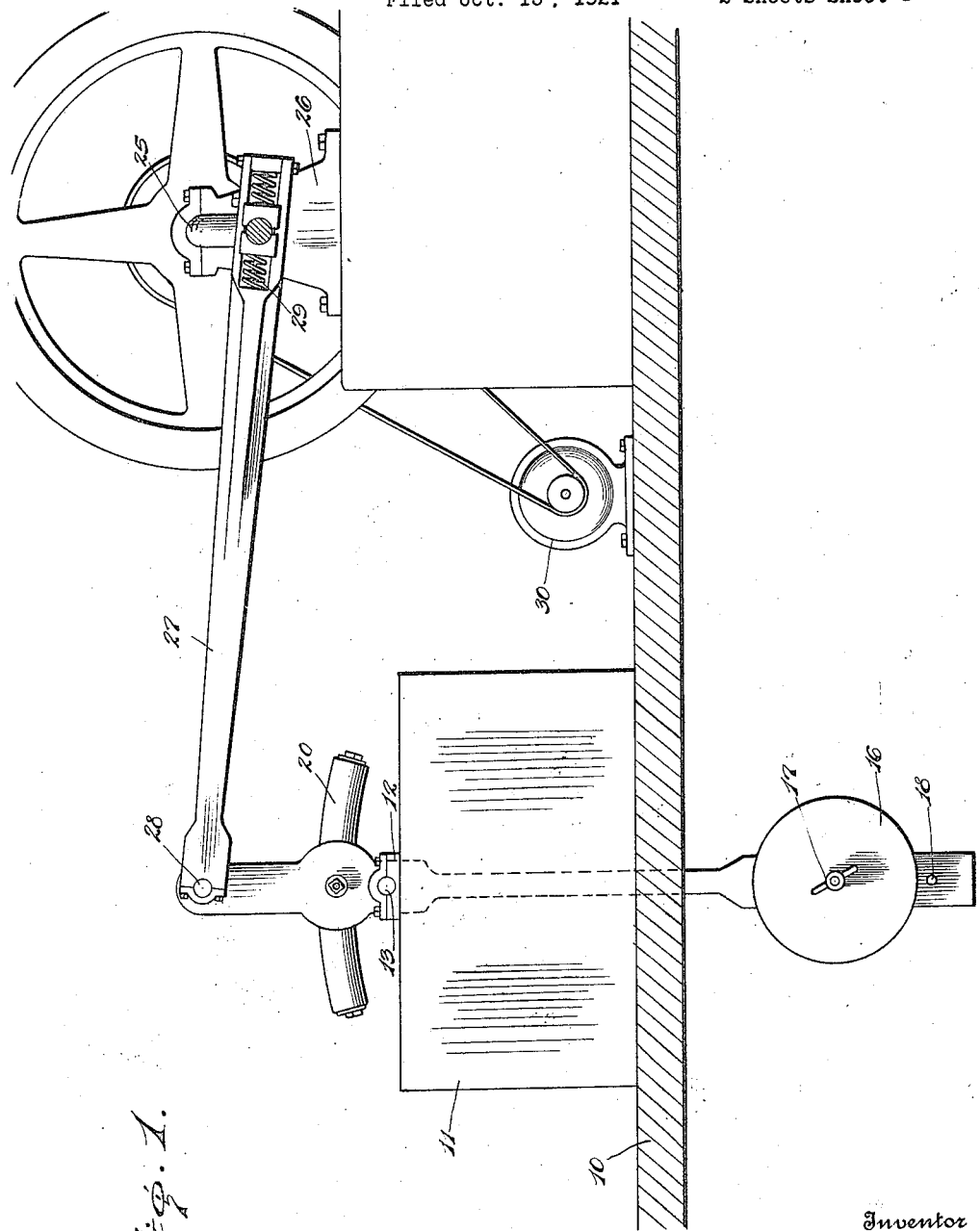

March 4, 1924.

I. V. BILYEU

PENDULUM

Filed Oct. 15, 1921

1,485,664

2 Sheets-Sheet 1

Inventor
I. V. Bilyeu.
By Lacey & Lacey.
Attorneys

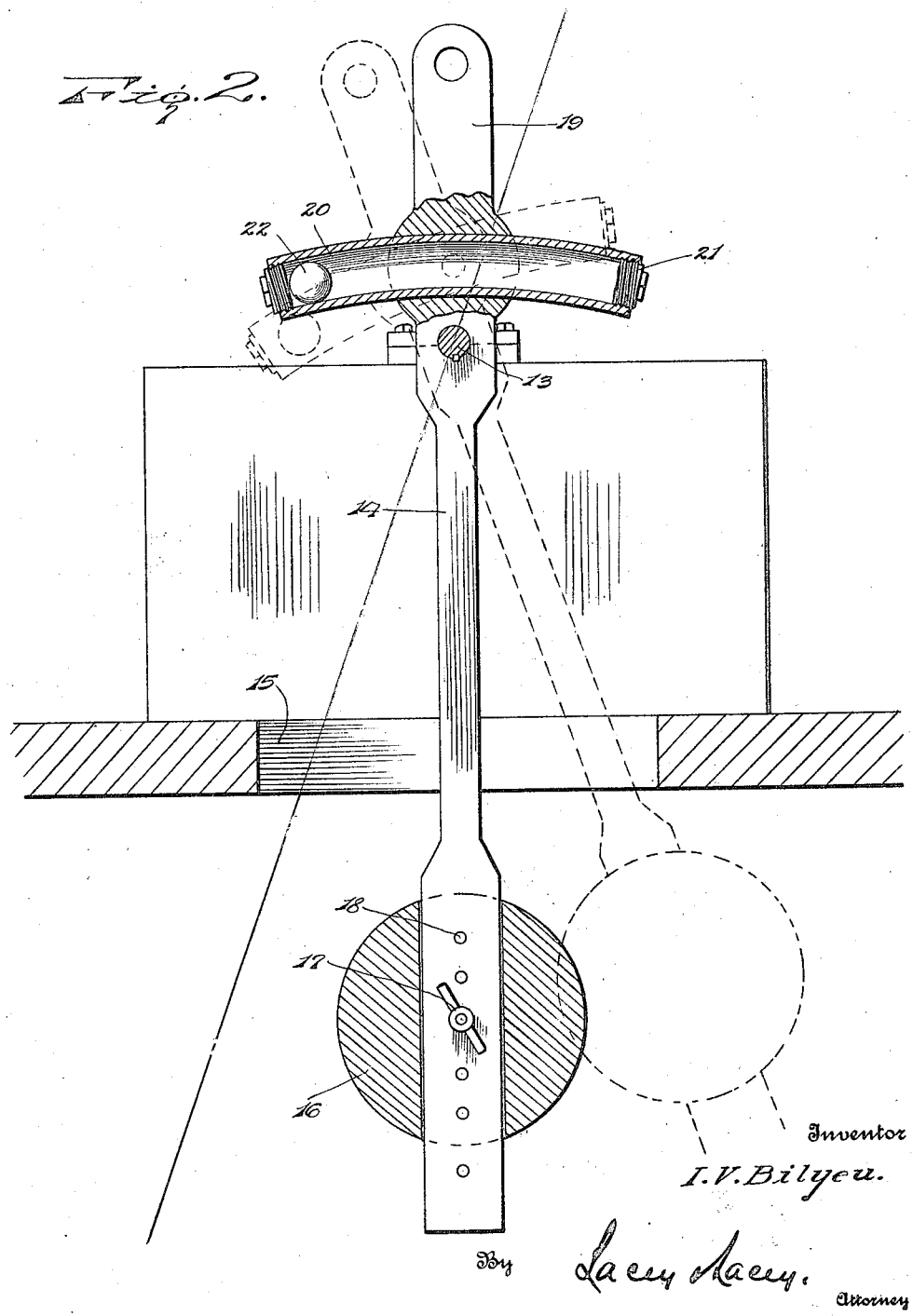

Patented Mar. 4, 1924.

1,485,664

UNITED STATES PATENT OFFICE.

ISAAC V. BILYEU, OF PUTNAM, ILLINOIS.

PENDULUM.

Application filed October 15, 1921. Serial No. 507,984.

*To all whom it may concern:*

Be it known that I, ISAAC V. BILYEU, a citizen of the United States, residing at Putnam, in the county of Putnam and State of Illinois, have invented certain new and useful Improvements in Pendulums, of which the following is a specification.

My invention relates to a pendulum device and the main object of the invention is to provide a pendulum that has an approximately even speed of its oscillations. It is well known, that an ordinary pendulum has its greatest speed near the perpendicular and comes to a dead stop at its extreme, deflected positions. My device is so designed that the speed near the turning points of oscillations will be accelerated and more like the speed the pendulum has near its central position.

The practical use of this construction may be as an attachment to a pump for hoisting water out of a well. As is well known, a pump, at a farm for instance, is seldom used continuously but only runs for a short time and in this manner the pendulum, having a connection with the crank shaft of the pump, may be set in motion and the pump would in this manner be going as long as the pendulum oscillates.

One embodiment of the invention is illustrated in the accompanying drawings, and Figure 1 shows an elevation of the application of the pendulum for driving the pump shaft; and Figure 2 an elevation in partial section illustrating the pendulum more in detail.

Upon the floor 10 is erected a stand 11 carrying bearings 12 for a shaft 13. Upon this shaft is mounted a staff 14 extending below the floor line through an aperture 15 in the floor 10. This aperture is preferably made in the form of an oblong, narrow slot, long enough for the pendulum to swing in.

At the lower end of the staff 14 is attached a heavy weight 16 which may be secured in any suitable position up and down on the staff 14, by means of a bolt and nut 17 engaging in any one of the holes 18 provided along the lower end of the staff 14. It will be evident that, by raising or lowering the weight 16 on the staff, the oscillations of the pendulum may be made rapid or slow as required.

The staff 14 is extended upwardly to form an arm 19 and near the shaft 13 and above the same, the staff has an enlargement for receiving a transverse tube 20. This tube 20 is securely fastened in the arm 19 of the staff 14 and its axis coincides with the plane of oscillation of the pendulum and is preferably at its extreme ends bent downwardly. This is accomplished in the embodiment illustrated in the drawings, by bending the tube 20 to a radius, the center of which is located on the axis of the staff 14 near its lower end. This is found to be the best construction but the pipe might also be straight or bent over the center line of the staff 14, with its two branches forming straight pipes having their ends lower than the center.

In this tube 20, which is closed at both ends by means of plugs 21 or in any other suitable manner, I insert a heavy ball 22 slightly smaller in diameter than the interior diameter of the tube 20, so that it may be free to roll from one end to the other of the tube.

In Figure 1 reference numeral 25 represents the crank shaft of a pump mounted in suitable bearings 26 and connected by means of a pitman 27 to the upper end of arm 19, where it is journaled on a pin 28. As the length of the strokes of the crank shaft 25 are constant, and the length of oscillations of the arm 19 vary, there is provided an elastic mounting 29 in the pitman 27 to compensate for these variations.

The pendulum may be started by direct pull on the same in one direction or I may provide a small motor 30 connected by pulleys and belt drive with the crank shaft 25 as indicated in the drawings.

The operation of the device is as follows:

Supposing the pendulum has been drawn to the right as seen in Figure 2, when the left end of tube 20 will be in its lowermost position and consequently the ball abutting against the plug 21 at this end of the tube, the center of gravity of the unit will consequently not be situated on the axis of the staff 14 but slightly toward the left thereof as seen in Figure 2. The pendulum will now start on its downward swing, when the left end of the tube 20 will commence to rise until its center will be about level with the center point of the tube on the perpendicular. Immediately after this, and when the staff 14 is just past the perpendicular, the ball 22 will start to roll over to the right end of the tube 20, gradually increasing its speed until it at last hits plug 21 at the right end of the tube with a blow, which will then give an impulse to the pendulum to swing faster in the left hand direction. It will now be evident that the pendulum, instead of swinging from its turning point with a gradual increase in speed to the perpendicular and then gradual decrease to the other end of the swing, the speed of the pendulum will be greater than normally, between the perpendicular and the turning point on each side of its swing, thereby producing a more even running in each direction of the pitman 27 if the pendulum is connected as illustrated in Figure 1.

Having thus described the invention what is claimed as new is:

1. In a pendulum, having a staff with a weight at its lower end adjustable in longitudinal direction of said staff and a journal upon which it is mounted to oscillate; a tubular guide-way on said staff adjacent said journal and a body mounted upon said guide-way to travel thereon, said guide-way extending transversely to said staff in the plane of oscillation.

2. In a pendulum, having a staff with a weight at its lower end adjustable in longitudinal direction of said staff and a journal upon which it is mounted to oscillate; a tubular guide-way on said staff adjacent said journal and a body mounted upon said guide-way to travel thereon, said guide-way extending transversely to said staff in the plane of oscillation and having its extreme ends situated lower than its center point in position of rest.

3. In a pendulum, having a staff with a weight at its lower end adjustable in longitudinal direction of said staff and a journal upon which it is mounted to oscillate; a tubular guide-way on said staff adjacent said journal and a body mounted upon said guide-way to travel thereon, said guide-way extending transversely to said staff in the plane of oscillation, said guide-way being bent to a radius the center of which is situated on the axis of said staff below said journal.

4. In a pendulum, having a staff with a weight at its lower end adjustable in longitudinal direction of said staff and a journal upon which it is mounted to oscillate; an arcuate tube having closed ends and being rigidly secured to said staff above said journal, the axis of said tube being situated in the plane of oscillation of the pendulum and its extreme ends positioned lower than its center point, and a ball mounted within said tube to roll from end to end thereof.

5. In a pendulum, having a staff with a weight at its lower end adjustable in longitudinal direction of said staff and a journal upon which it is mounted to oscillate; an arcuate tube having closed ends and being rigidly secured to said staff above said journal, the axis of said tube being situated in the plane of oscillation of the pendulum and its extreme ends positioned lower than its center point, a ball mounted within said tube to roll from end to end thereof, a pitman journaled on said staff and being connected with the crank shaft of a machine.

In testimony whereof I affix my signature.

ISAAC V. BILYEU. [L. S.]